United States Patent
Surowaniec

(10) Patent No.: US 9,837,120 B2
(45) Date of Patent: Dec. 5, 2017

(54) VAPOR AND HEAT REMOVAL SYSTEMS IN AN OPTICAL DISC RESTORATION DEVICE

(71) Applicant: Venmill Industries Incorporated, Oxford, MA (US)

(72) Inventor: Mariusz Surowaniec, Thompson, CT (US)

(73) Assignee: VenMill Industries Incorporated, Oxford, MA (US)

(*) Notice: Subject to any disclaimer, the term of this patent is extended or adjusted under 35 U.S.C. 154(b) by 129 days.

(21) Appl. No.: 14/640,346

(22) Filed: Mar. 6, 2015

(65) Prior Publication Data

US 2015/0255118 A1   Sep. 10, 2015

Related U.S. Application Data

(63) Continuation of application No. 14/401,967, filed on Nov. 18, 2014, now Pat. No. 9,620,166.

(60) Provisional application No. 61/949,310, filed on Mar. 7, 2014.

(51) Int. Cl.
| | | |
|---|---|---|
| *G11B 23/50* | (2006.01) | |
| *B24B 13/00* | (2006.01) | |
| *B24B 55/06* | (2006.01) | |
| *B24B 37/10* | (2012.01) | |
| *B24B 55/04* | (2006.01) | |
| *B24B 7/24* | (2006.01) | |
| *B24B 5/04* | (2006.01) | |
| *B24B 55/02* | (2006.01) | |

(52) U.S. Cl.
CPC ............ *G11B 23/507* (2013.01); *B24B 13/00* (2013.01); *B24B 37/10* (2013.01); *B24B 55/045* (2013.01); *B24B 55/06* (2013.01); *G11B 23/505* (2013.01); *B24B 5/047* (2013.01); *B24B 7/24* (2013.01); *B24B 55/02* (2013.01)

(58) Field of Classification Search
CPC ............ B24B 5/047; B24B 7/24; B24B 13/00; B24B 37/04; B24B 37/10; B24B 55/02; B24B 55/045; B24B 55/06; G11B 23/507; G11B 23/505
See application file for complete search history.

(56) References Cited

U.S. PATENT DOCUMENTS

| | | | | |
|---|---|---|---|---|
| 4,280,155 A | * | 7/1981 | Scott | G11B 23/505 360/133 |
| 4,783,870 A | * | 11/1988 | Yeung | G11B 23/505 15/97.1 |
| 6,261,159 B1 | | 7/2001 | Krieg et al. | |
| 6,386,946 B1 | * | 5/2002 | Lin | B24B 7/228 451/287 |
| 6,802,760 B1 | | 10/2004 | Goldstein | |
| 7,014,543 B1 | | 3/2006 | Holbrook et al. | |
| 7,104,871 B1 | * | 9/2006 | Kennedy | B24B 37/04 451/287 |
| 8,683,638 B2 | * | 4/2014 | Montabaur | A46B 13/005 15/23 |
| 8,801,506 B2 | * | 8/2014 | Chen | B24B 23/028 451/359 |
| 2008/0212440 A1 | | 9/2008 | Verschuren | |

(Continued)

*Primary Examiner* — Timothy V Eley
(74) *Attorney, Agent, or Firm* — Grossman Tucker Perreault & Pfleger PLLC

(57) ABSTRACT

The invention pertains in general to devices, systems and methods for removing vapor and heat generated during a restoration cycle in an optical disc restoration device.

8 Claims, 3 Drawing Sheets

(56) References Cited

U.S. PATENT DOCUMENTS

2011/0143636 A1    6/2011  Miyahara
2013/0181465 A1*  7/2013  Miyahara ............. G11B 23/505
                                                  294/90

* cited by examiner

VAPOR AND HEAT REMOVAL SYSTEMS IN AN OPTICAL DISC RESTORATION DEVICE

CROSS REFERENCE TO RELATED APPLICATIONS

This application claims benefit of U.S. Provisional Application Ser. No. 61/949,310, entitled, "Vapor and Heat Removal Systems in an Optical Disc Restoration Device, and Devices, Systems and Methods Thereof" filed Mar. 7, 2014 and is a continuation-in-part of U.S. application Ser. No. 14/401,967, entitled "Devices. Methods and Systems for Restoring Optical Discs" filed Nov. 18, 2014, which claims benefit of U.S. Provisional Application Ser. No. 61/648,675, entitled "Devices, Methods and Systems for Restoring Optical Discs" filed May 18, 2012, the entire disclosures of which are incorporated herein by reference.

FIELD OF THE INVENTION

The invention pertains in general to devices, systems and methods for removing vapor and heat generated in an optical disc restoration device during a restoration cycle. In particular the invention pertains to fan blade and exhaust port systems for removal of vapor and heat generated during an optical disc restoration cycle, wherein the fan blade is rotated with the rotation of one or more optical disc restoration pads, thereby optimizing disc repair.

BACKGROUND OF THE INVENTION

An optical disc restoration device is adapted for restoring, repairing and for polishing the surface of optical discs, namely compact discs (CD's), digital versatile discs (DVD's) and Blu-ray discs. A conventional optical disc restoration device generally comprises a housing, a motor mounted in the housing, an operation platen mounted in the housing and adapted for holding an optical disc, and pads or buffers, typically housed in a top lid of a an optical disc restoration device and rotatable by the motor to restore, repair or polish an optical disc.

During restoration cycles, application of water and polishing or abrasive compound to a disc, along with pressure from the pads rotating on an optical disc, results in removal of scratches, blemishes and the like on an optical disc. During a restoration cycle significant vapor and heat build-up in the optical disc restoration device, which may be managed during the restoration cycle to optimize disc repair. During a restoration cycle evaporation of water may result in significant vapor build-up inside the restoration device, in addition materials such as steel shells on the restoration device may result in greater vapor build-up during a restoration cycle as steel tends to remain cooler while internal temperatures of the device may have elevated heat conditions, resulting in condensation and vapor production.

Similarly temperatures in an optical disc restoration device become elevated during a restoration cycle. Temperatures in the range of 100-105 degrees Fahrenheit may be ideal for repairing a disc, while temperatures in the range of 150 degrees Fahrenheit or greater may result in damage to the polymer layer of the optical disc, and result in permanent damage of the optical disc contents. Typically water is used as a method of controlling heat build-up in optical disc restoration devices, which may also results in vapor build-up, which the current invention further helps remove.

It is thus very important to manage vapor build-up and heat build-up during an optical disc restoration cycle in order to provide optimized restoration conditions. The inventors have thus developed a vapor and heat removal system for optical disc restoration devices, for optimizing conditions during a restoration cycle. In addition, the inventors have developed a vapor and heat removal system by conveniently locating fan blades on the back of the pads, which rotate during an optical disc restoration cycle and thereby also rotate the fan blades. The inventors have further developed methods for removing vapor and heat build-up during an optical disc restoration cycle by using the rotation of the fan blades and the location of the vapor and heat build-up source for efficient vapor and heat removal.

SUMMARY OF THE INVENTION

Embodiments of the present invention provide devices, systems and methods for removal of excess vapor and heat build-up in an optical disc restoration device, for optimizing restoration, repair and polishing of an optical disc including but not limited to compact discs (CD's), digital versatile discs (DVD's), and Blu-ray discs. In this regard, one embodiment of the present invention may be summarized by the following features, including but not limited to, an optical disc restoration device with a vapor and heat removal system including: a platen for holding an optical disc, at least one pad for polishing the optical disc, a water supply means, one or more fan blades, wherein the fan blades are attached on the side of the pads opposite to the side that restores the optical disc, and, one or more exhaust ports, wherein the one or more exhaust ports provides for removal of vapor and heat from the optical disc restoration device when the fan blades rotate.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims. It should be noted that the language used in the specification has been principally selected for readability and instructional purposes, and may not have been selected to delineate or circumscribe the inventive subject matter.

DEFINITIONS

Evaporation is a type of vaporization of a liquid that occurs from the surface of a liquid into a gaseous phase that is not saturated with the evaporating substance.

Vapor is a substance in a gas phase at a temperature lower than its critical point to be in a solid or liquid phase. Water as an example may be transferred from a liquid phase through evaporation into a gas phase.

BRIEF DESCRIPTION OF THE FIGURES

Many aspects of the invention can be better understood with reference to the following drawings. The components in the drawings are not necessarily to scale, emphasis instead being placed upon clearly illustrating the principles of the present invention.

DETAILED DESCRIPTION OF THE INVENTION

Figure 1:
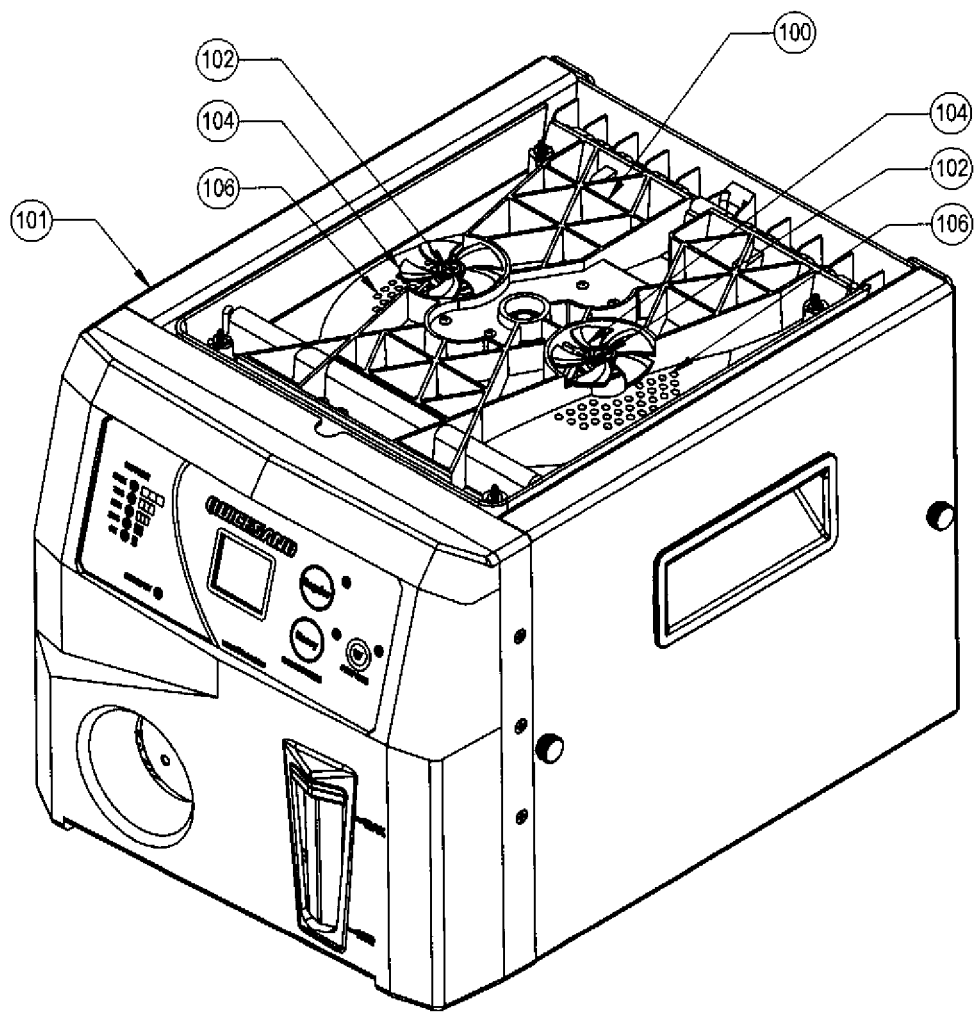
FIG. 1 shows a perspective view of fan blades in a top lid of an optical disc restoration device, in accordance with one embodiment of the present invention.

The invention provides devices, systems and methods for reducing vapor and heat build-up in an optical disc restoration device. In particular the invention pertains to optical disc restoration devices with a specialized fan blade system for removing excess vapor and heat build-up during a restoration cycle.

In accordance with one embodiment of the present invention, which may be summarized by the following features, including but not limited to, an optical disc restoration device with a vapor and heat removal system including: a platen for holding an optical disc; at least one rotating pad for polishing an optical disc, a water supply means, one or more fan blades, wherein the fan blades are attached on the side of the pads opposite to the side that restores the optical disc, and, one or more exhaust ports, wherein the exhaust ports provide for removal of vapor and heat from the optical disc restoration device when the fan blades rotate. The present embodiment may further include a top lid, with the rotating pads connected to the top lid. In accordance with this embodiment, when the top lid is in a closed position the rotating pads will be in contact with an optical disc on the platen. Further in accordance with this embodiment a latching mechanism is provided for securing the top lid to the optical disc repair device, and maintaining a constant pressure of the pads on the optical disc.

In accordance with the present embodiment, a motor provided with the optical disc restoration device may be used to power the platen holding the optical disc, to rotate the pads and to power one or more fan blades. In accordance with this embodiment two fan blades may be provided with two rotating pads to optimize disc repair. Further in accordance with this embodiment, at least one water supply channel may be provided adjacent to the pads for supplying water during the optical disc restoration cycle. Further in accordance with this embodiment a transparent or an opaque window may be provided above the fan blades, so that a user can see the fan blades rotating during a restoration cycle. In accordance with this embodiment the fan blades may be colored or designed for aesthetic appeal to a user. Further in accordance with the present embodiment, the top lid may have about 25 to 35 exhaust ports over each fan blade for removal of vapor and heat during a restoration cycle. In accordance with this embodiment the exhaust ports may be about 3-6 mm for optimized removal of heat, and aesthetic appeal for a user. Further in accordance with the present embodiment a mesh may be placed over the exhaust ports for safety purposes.

The present embodiment may also have a fan blade regulator, so that the fan blade turns on when the internal temperature of the optical disc restoration device reaches levels above a desired range. In accordance with the present embodiment the fan blade regulator may turn on when the restoration cycle temperatures reaches over 110 degrees Fahrenheit. As one example, a fan blade regulator may be an electric fan that is controlled by a temperature sensor that turns the fan on when the temperature or vapor level is higher than desired. The present embodiment may further have a manual switch and a user interface, wherein a user may manually turn on the fan blades when the restoration cycle temperatures or vapor levels reaches a higher than desired level, which may be indicated to a user on the user interface.

FIG. 1 shows perspective view of a fan blade system in accordance with one embodiment of the present invention. In accordance with this embodiment the fan blades 104 are attached to the top lid 100 of an optical restoration device 101 through the screws 102. In accordance with this embodiment exhaust ports 106 are shown on the top lid 100 for releasing vapor and heat produced in the optical disc restoration device during a restoration cycle. In accordance with this embodiment, pads will be attached to the bottom side of the fan blades 104. In accordance with this embodiment when the top lid is in a closed position, the pads will be in contact with an optical disc on an optical disc platen to rotate and restore the optical disc during a restoration cycle. Further in accordance with this embodiment, vapor and heat is generated during an optical disc restoration cycle, which may be managed and released through the fan blades 104, which rotate when the pads rotate, thereby releasing heat through the exhaust ports 106.

Figure 2:
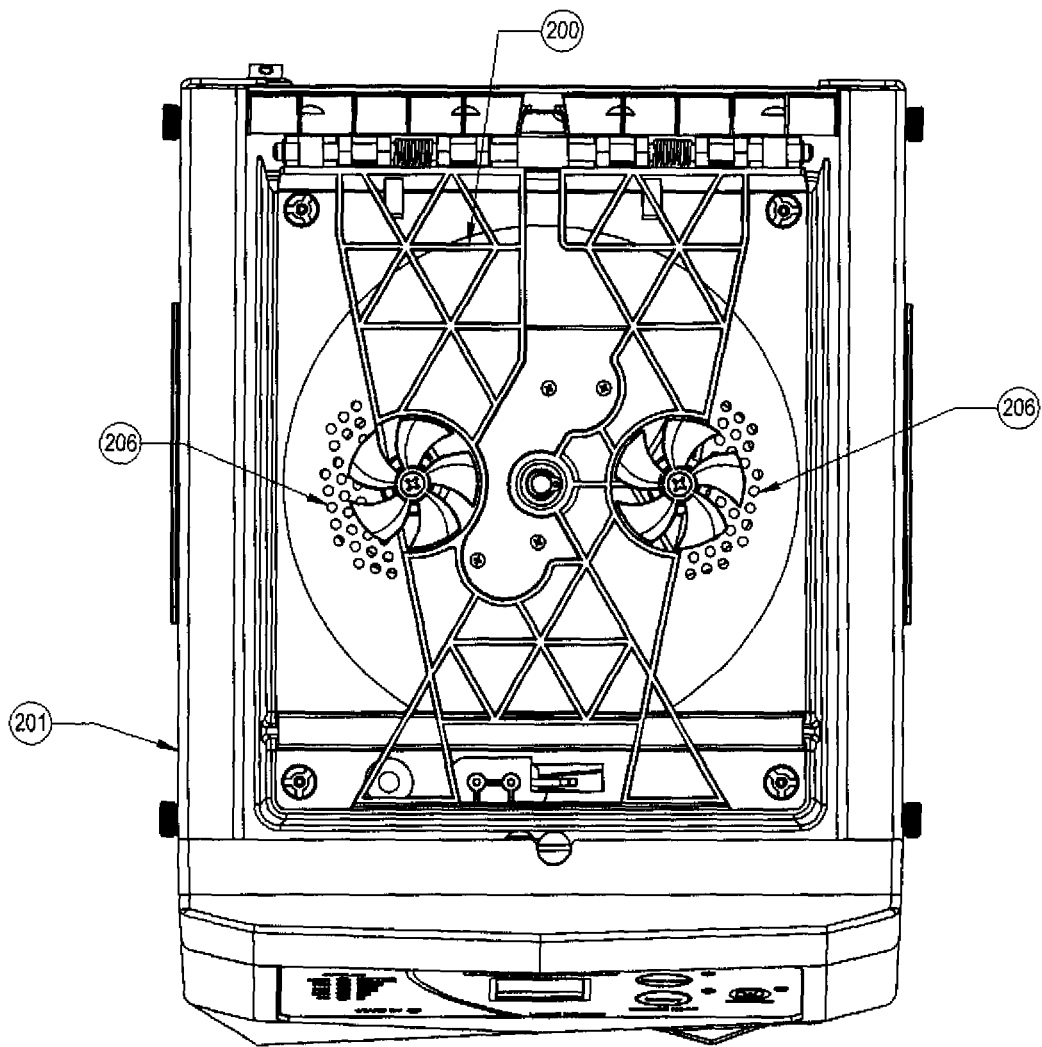
FIG. 2 shows a top view of fan blades with a top lid closed in an optical disc restoration device, in accordance with one embodiment of the present invention.

FIG. 2 shows a top view of a fan blade system in accordance with one embodiment of the present invention. In accordance with this embodiment, the top lid 200 of the optical restoration device 201 is in a closed position with exhaust ports 206 shown for removal of vapor and heat produced in an optical disc restoration device in a restoration cycle.

Figure 3:
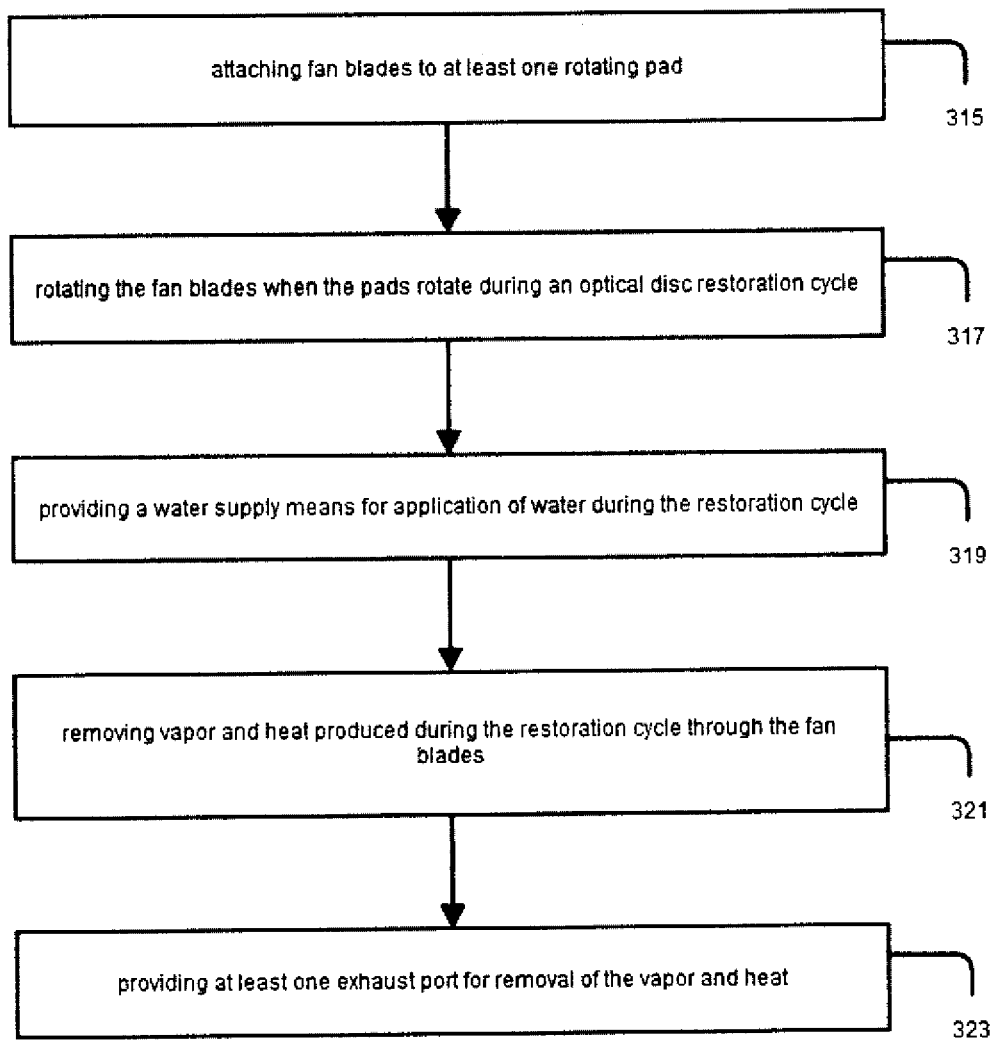
FIG. 3 shows a flowchart of the steps used to remove vapor and heat build-up in an optical disc restoration device in accordance with one embodiment of the present invention.

In accordance with another embodiment of the present invention as shown in the flowchart of FIG. 3, a method for reducing vapor and heat build-up in an optical disc restoration device is described, including but not limited to the steps of: attaching fan blades to at least one rotating pad, step 315; rotating the fan blades when the pads rotate during an optical disc restoration cycle, step 317; providing a water supply means for application of water during the restoration cycle, step 319; removing vapor and heat produced during the restoration cycle through the fan blades, step 321; providing at least one exhaust port for removal of the vapor and heat, step 323. In accordance with this embodiment, another step of providing a top lid for holding the at least one rotating pad, such that the pad presses against an optical disc when the top lid is in a closed position may be desired. In accordance with this embodiment a next step of providing about 25 to 35 exhaust ports on the top lid behind the at least one fan blade for optimizing removal of excess vapor and heat during a restoration cycle is further described. In addition, in accordance with the present embodiment, in yet another step of providing a transparent or opaque window on the top lid above the at least one fan blade, allows a user to see the fan blade rotating when the fan blade is in an on position. Yet further in accordance with the present embodiment, a latching mechanism may be provided to hold the top lid when in a closed position at an optimized pressure point for restoring the optical disc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. An optical disc restoration device with a vapor and a heat removal system including:
   a platen for holding the optical disc;
   one or more pads configured to contact the optical disc and polish the optical disc;
   a water supply;
   one or more fan blades, wherein the one or more fan blades are attached on a first side of the one or more pads, wherein the first side is opposite of the side that is configured to restore the optical disc; and,
   one or more exhaust ports, wherein the one or more exhaust ports provide for removal of the vapor and heat from the optical disc restoration device when the one or more fan blades rotate.

2. The optical disc restoration device in accordance with claim 1 further including a top lid, wherein the one or more pads are connected to said top lid.

3. The optical disc restoration device in accordance with claim 2 further including a latching mechanism for securing said top lid during a restoration cycle and holding the one or more pads on said optical disc.

4. The optical disc restoration device in accordance with claim 3 further including a motor, wherein said motor controls rotation of said platen holding said optical disc, the one or more pads and the one or more fan blades.

5. The optical disc restoration device in accordance with claim 1 further including a transparent window above the one or more fan blades, wherein a user may see rotation of the one or more fan blades through said transparent window when the one or more fan blades are in an on position.

6. The optical disc restoration device in accordance with claim 1 further including a opaque window above the one or more fan blades, wherein a user may see rotation of the one or more fan blades through said opaque window when the one or more fan blades are in an on position.

7. The optical disc restoration device in accordance with claim 1 further including about 25 to about 35 exhaust ports above the one or more fan blades.

8. The optical disc restoration device in accordance with claim 1 further including a mesh over said exhaust ports.

* * * * *